(12) United States Patent
Furui et al.

(10) Patent No.: US 8,675,961 B2
(45) Date of Patent: Mar. 18, 2014

(54) IMAGE PROCESSING SYSTEM, DISPLAY DEVICE, PROGRAM AND INFORMATION STORAGE MEDIUM FOR CORRECTION OF COLOR INFORMATION

(75) Inventors: Shiki Furui, Matsumoto (JP); Hitoshi Hayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 558 days.

(21) Appl. No.: 12/180,285

(22) Filed: Jul. 25, 2008

(65) Prior Publication Data

US 2009/0040542 A1 Feb. 12, 2009

Related U.S. Application Data

(60) Provisional application No. 61/055,264, filed on May 22, 2008.

(30) Foreign Application Priority Data

Aug. 9, 2007 (JP) ................................. 2007-207652

(51) Int. Cl.
*G06K 9/00* (2006.01)

(52) U.S. Cl.
USPC ........... 382/167; 382/162; 358/520; 358/518; 358/516

(58) Field of Classification Search
CPC .................................................... H04N 1/6005
See application file for complete search history.

(56) References Cited

U.S. PATENT DOCUMENTS

| | | | | |
|---|---|---|---|---|
| 4,694,286 A | * | 9/1987 | Bergstedt ...................... | 345/594 |
| 5,204,665 A | * | 4/1993 | Bollman et al. .............. | 345/605 |
| 5,204,948 A | * | 4/1993 | Kato .............................. | 358/520 |
| 5,243,414 A | * | 9/1993 | Dalrymple et al. ........... | 358/500 |
| 5,334,992 A | * | 8/1994 | Rochat et al. .................. | 345/22 |
| 5,398,120 A | * | 3/1995 | Friedman et al. ............. | 358/501 |
| 6,140,997 A | * | 10/2000 | Tanaka .......................... | 345/604 |
| 8,023,156 B2 | * | 9/2011 | Mestha et al. ............... | 358/3.23 |
| 2004/0057060 A1 | * | 3/2004 | Johannesson et al. ......... | 358/1.9 |
| 2004/0252345 A1 | * | 12/2004 | Uekusa et al. ................. | 358/2.1 |
| 2005/0190967 A1 | * | 9/2005 | Ok et al. ....................... | 382/167 |
| 2007/0121180 A1 | * | 5/2007 | Ogawa .......................... | 358/518 |
| 2008/0095430 A1 | * | 4/2008 | Jaspers ......................... | 382/167 |

FOREIGN PATENT DOCUMENTS

| | | |
|---|---|---|
| JP | A-09-270927 | 10/1997 |
| JP | A-11-313219 | 11/1999 |
| JP | A 2002-305644 | 10/2002 |
| JP | A-2002-305664 | 10/2002 |

(Continued)

OTHER PUBLICATIONS

HSL and HSV—Wikipedia.*

(Continued)

*Primary Examiner* — Firmin Backer
*Assistant Examiner* — Christopher D Wait
(74) *Attorney, Agent, or Firm* — Oliff PLC

(57) ABSTRACT

An image processing system includes: an update unit updating color space information indicating a color space by allowing rotational movement of a selected reference color, taking a line connecting a white color to a black color in the color space as a rotation axis, based on adjustment information indicating that hue of at least one reference color is adjusted, which is in a reference color group including plural reference colors of a RGB system and plural reference colors of a CMY system in the color space; and a correction unit correcting an input image signal based on the color space information.

10 Claims, 7 Drawing Sheets

(56) References Cited

FOREIGN PATENT DOCUMENTS

| | | |
|---|---|---|
| JP | A-2002-330298 | 11/2002 |
| JP | A-2004-013361 | 1/2004 |
| JP | A-2004-242040 | 8/2004 |
| JP | A-2006-340107 | 12/2006 |
| JP | A-2007-013724 | 1/2007 |
| JP | A-2007-096612 | 4/2007 |
| JP | A 2007-150943 | 6/2007 |

OTHER PUBLICATIONS

Fundamentals of True-Color Image Processing, R.S. Ledley, M. Buas, T.J. Golab; IEEE 1990.*

* cited by examiner

IMAGE PROCESSING SYSTEM, DISPLAY DEVICE, PROGRAM AND INFORMATION STORAGE MEDIUM FOR CORRECTION OF COLOR INFORMATION

BACKGROUND

1. Technical Field

The invention relates to an information processing system, a display device, a program and an information storage medium for adjusting color.

2. Related Art

As disclosed in JP-A-2007-96612, there is a method of changing an RGB color space into a HSV color space as a method of adjusting the color of an image. In the case of the method, all colors are affected by the adjustment. In JP-A-2007-96612, a method of adjusting hue, chroma and brightness are adjusted with respect to respective RGBCMY is proposed. Specifically, as a method adjusting hue, a method of moving a specific color (for example, R-color, B-color and the like) to an adjacent color is applied in the method of JP-A-2007-96612 and JP2002-330298.

However, for example, when any hue of RGB is adjusted, the hue comes close to W (white), which increases brightness, and when any hue of CMY is adjusted, the hue comes close to K (Black), which decreases brightness, as a result, it becomes difficult to adjust the color to be a target color (hue, brightness and chroma). Generally, when the adjustment of increasing brightness is performed, an image washes out as well as chroma decreases, therefore, it is difficult to adjust the color to be a target color.

Additionally, complex calculation becomes necessary for changing the RGB color space into the HSV color space, a Lab color space and the like, which reduces the efficiency of image processing. For example, in the color space used for fitting the color of an image in a display device to the color of an image outputted from a printer, it is necessary to change the RGB color space into information showing device independent color such as the Lab space, however, it is not necessary to consider the device independent color in the display device, therefore, it is inefficient to change the RGB color space into the Lab color space and the like.

SUMMARY

An advantage of some aspects of the invention is to provide an image processing system, a display device, a program and an image storage medium, in which color adjustment to a target color can be easily performed.

According to an aspect of the invention, there is provided an image processing system including an update unit updating color space information showing a color space by allowing rotational movement of a selected reference color, taking a line connecting a white color to a black color in the color space as a rotation axis, based on adjustment information showing that hue of at least one reference color is adjusted, which is in a reference color group including plural reference colors of a RGB system and plural reference colors of a CMY system in the color space, and an correction unit correcting an input image signal based on the color space information.

According to another aspect of the invention, there is provided a display device including the image processing system and a display unit displaying an image based on the input image signal corrected by the correction unit.

According to still another aspect of the invention, there is provided a program allowing a computer to function as an update unit updating color space information showing a color space by allowing rotational movement of a selected reference color, taking a line connecting a white color to a black color in the color space as a rotation axis, based on adjustment information showing that hue of at least one reference color is adjusted, which is in a reference color group including plural reference colors of a RGB system and plural reference colors of a CMY system in the color space, and an correction unit 140 correcting an input image signal based on the color space information.

According to still another aspect of the invention, there is provided a computer-readable information storage medium storing the above program.

According to the aspects of the invention, the image processing system or the like updates color space information by allowing rotational movement of a selected reference color, taking a line connecting a white color to a black color when adjusting hue to thereby adjust the color to a target color without changing brightness even when the hue has been adjusted.

According to still another aspect of the invention, there is provided an information processing system including an update unit updating color space information showing a color space by moving a reference color on a line connecting the reference color to a black color or a white color in the color space, based on adjustment information showing that brightness of at least one reference color is adjusted, which is in a reference color group including plural reference colors of a RUB system and plural reference colors of a CMY system in the color space, and an correction unit correcting an input image signal based on the color space information.

According to still another aspect of the invention, there is provided a display device including the image processing system and a display unit displaying an image based on the input image signal corrected by the correction unit.

According to still another aspect of the invention, there is provided a program allowing a computer to function as an update unit updating color space information showing a color space by moving a reference color on a line connecting the reference color to a black color or a white color in the color space, based on adjustment information showing that brightness of at least one reference color is adjusted, which is in a reference color group including plural reference colors of a RGB system and plural reference colors of a CMY system in the color space, and an correction unit correcting an input image signal based on the color space information.

According to still another aspect of the invention, there is provided a computer-readable information storage medium storing the above program.

According to the aspects of the invention, the image processing system or the like updates color space information by moving a reference color on a line connecting the reference color to a black color or a white color when adjusting brightness to thereby adjust the color to a target color without changing chroma even when the brightness has been adjusted.

The color space may be a three-dimensional space having apexes of respective reference colors, the black color and the white color, and the update unit may update the color space information based on an inverse matrix of a rotation matrix showing that the three-dimensional space is rotated so that the rotation axis corresponds to a line connecting the black color to a given reference color before rotation.

According to the above configuration, the image processing system or the like can calculate a value more efficiently by performing calculation based on the inverse matrix of the rotation matrix when allowing rotational movement of the reference color for adjusting hue.

The adjustment information may include information indicating that brightness of at least one reference color in the reference color group is adjusted, and the update unit may update the color space information by moving the reference color on a line connecting the reference color to the black color or the white color in the color space based on information indicating brightness of the reference color is adjusted.

According to the above configuration, the image processing system or the like updates the color space information by moving the reference color on the line connecting the reference color to the black color or the white color when adjusting brightness to thereby adjust the color to a target color without changing chroma even when the brightness has been adjusted.

The adjustment information may include information indicating that chroma of at least one reference color in the reference color group is adjusted, and the update unit may update the color space information by moving the reference color on a line orthogonal to a line connecting the black color and the white color in the color space as well as passing through the reference color based on the information indicating that the chroma of the reference color is adjusted.

According to the above configuration, an information processing system or the like can adjust the color to a target color without changing brightness or hue when adjusting chroma.

The color space may be a RGB color space, and the correction unit may adjust the color of an image displayed on a display device by correcting the input image signal.

According to the above configuration, it is not necessary that the image processing system or the like performs conversion of the color space and the like, therefore, the color of the image can be adjusted more efficiently.

It is also preferable that the image processing system or the like includes an adjustment information input unit inputting the adjustment information. The display unit may display an adjustment image for adjusting hue, chroma and brightness of each reference color and the adjustment information input unit may input the adjustment information according to the adjustment in the adjustment image.

According to the above configuration, the image processing system or the like can, for example, generate the color in accordance with a user's object when inputting adjustment information according to the input by the user.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in which the invention is applied to a projector including a function of adjusting color in an image will be explained with reference to the drawings. The embodiment shown below does not limit the contents of the invention described in claims at all. In addition, all configurations shown in the following embodiment are not fundamental as a means for solution in the invention disclaimed in claims.

Figure 1:
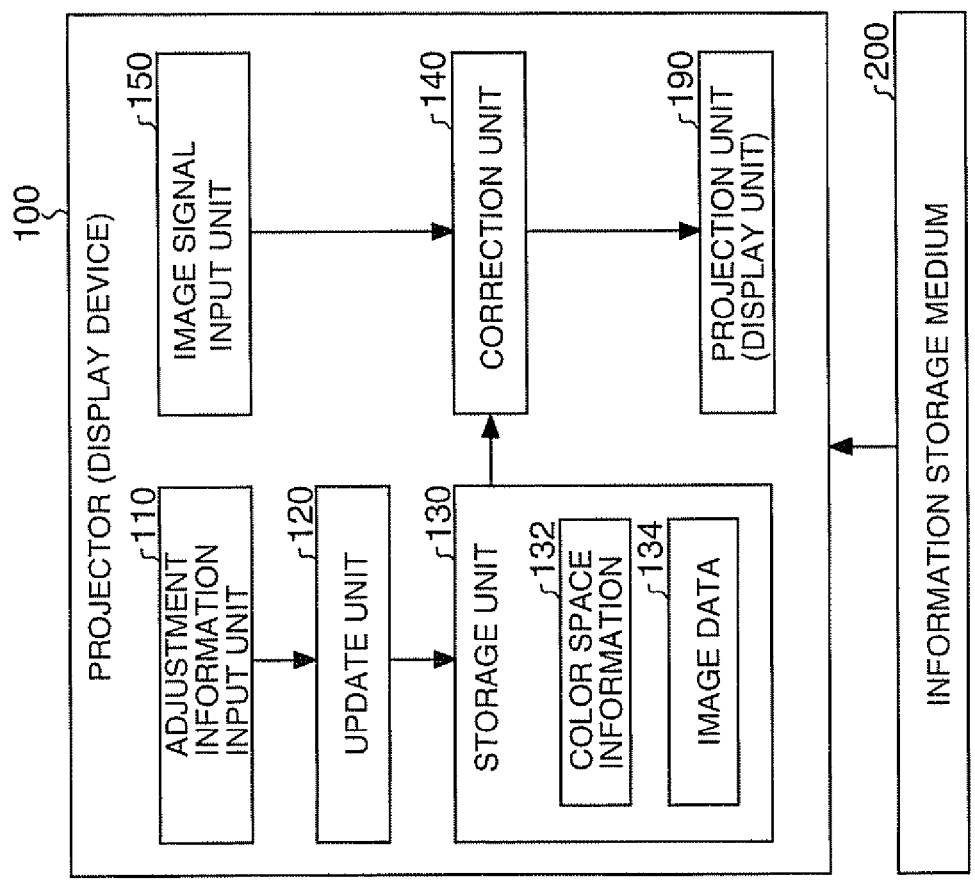
FIG. 1 is a functional block diagram of a projector according to an embodiment of the invention.

FIG. 1 is a functional block diagram of a projector 100 according to an embodiment. The projector 100 includes an adjustment information input unit 110 inputting adjustment information concerning adjustment of brightness and the like, a storage unit 130, an update unit 120 updating data in the storage unit 130, an image signal input unit 150 inputting image signals (for example, RGB signals and the like), a correction unit 140 correcting image signals and a projection unit 190 projecting images based on the corrected image signals. The projection unit 190 is a kind of a display unit displaying images and the projector 100 is a kind of display device.

The storage unit 130 stores color space information 132 indicating a color space, image data 134 for generating a later-described adjustment image and the like. In the embodiment, the color space is an RGB color space (referred to also as the RGB space).

It is also preferable that these components are mounted by using, for example, the following hardware. For example, as the adjustment information input unit 110, a remote controller, button and the like can be used, as the update unit 120, a CPU and the like can be used, as the storage unit 130, a RAM, an HDD and the like can be used, as the image signal input unit 150, an image signal input terminal and the like can be used, as the correction unit 140, an image processing circuit and the like can be used, and as the projection unit 190, a lamp, a liquid crystal panel, a liquid crystal driver, a projection lens and the like can be used for mounting.

A computer included in the projector 100 may mount functions such as the update unit 120 by reading programs from an information storage medium 200. As such information storage medium 200, for example, a CD-ROM, a DVD-ROM, a ROM, a RAM, or an HDD can be applied, in which program reading system may be either a contact type or a non-contact type.

Figure 2:
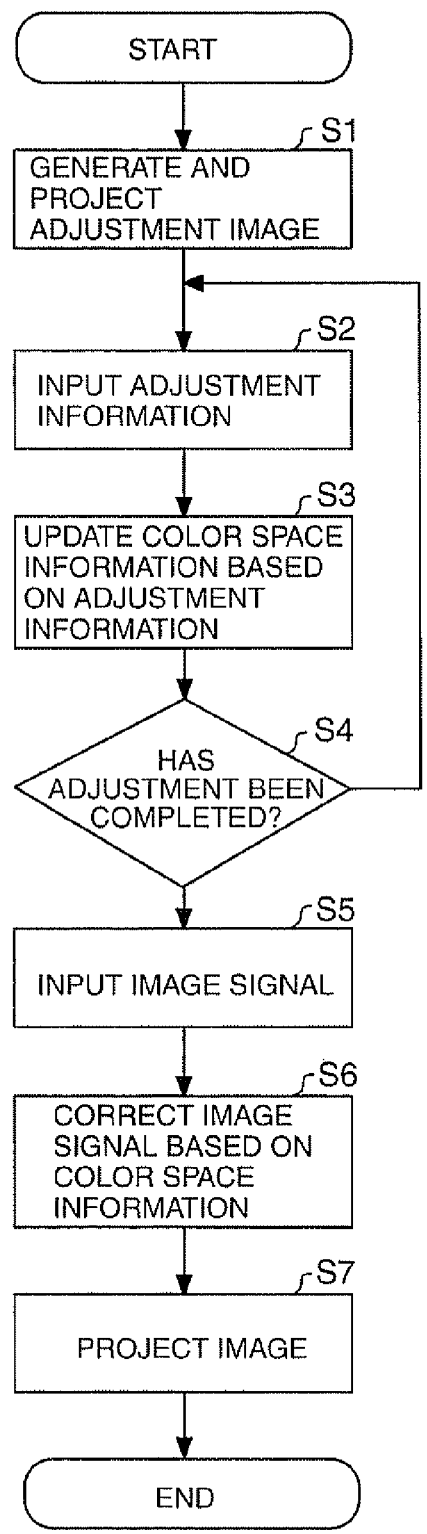
FIG. 2 is a flowchart showing a procedure of adjusting color of an image according to the embodiment.

Next, a procedure of adjusting color of an image using the update unit 120 and the like will be explained. FIG. 2 is a flowchart showing a procedure of adjusting color of an image according to the embodiment. First, the correction unit 140 generates an adjustment image by using the image data 134 and the projection unit 190 projects the adjustment image (Step S1).

Figure 3:
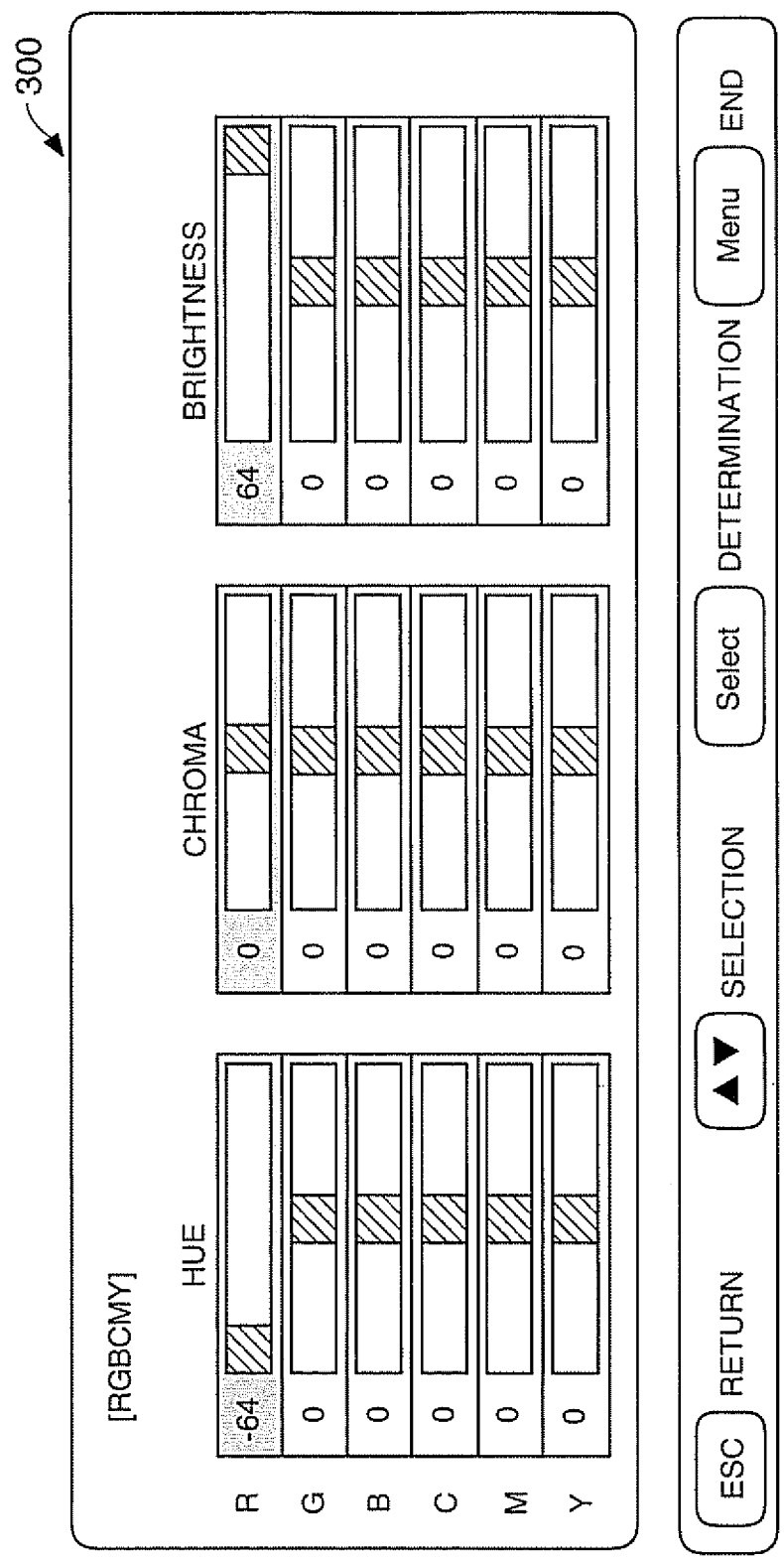
FIG. 3 is a view showing a first adjustment image according to the embodiment.
Figure 4:
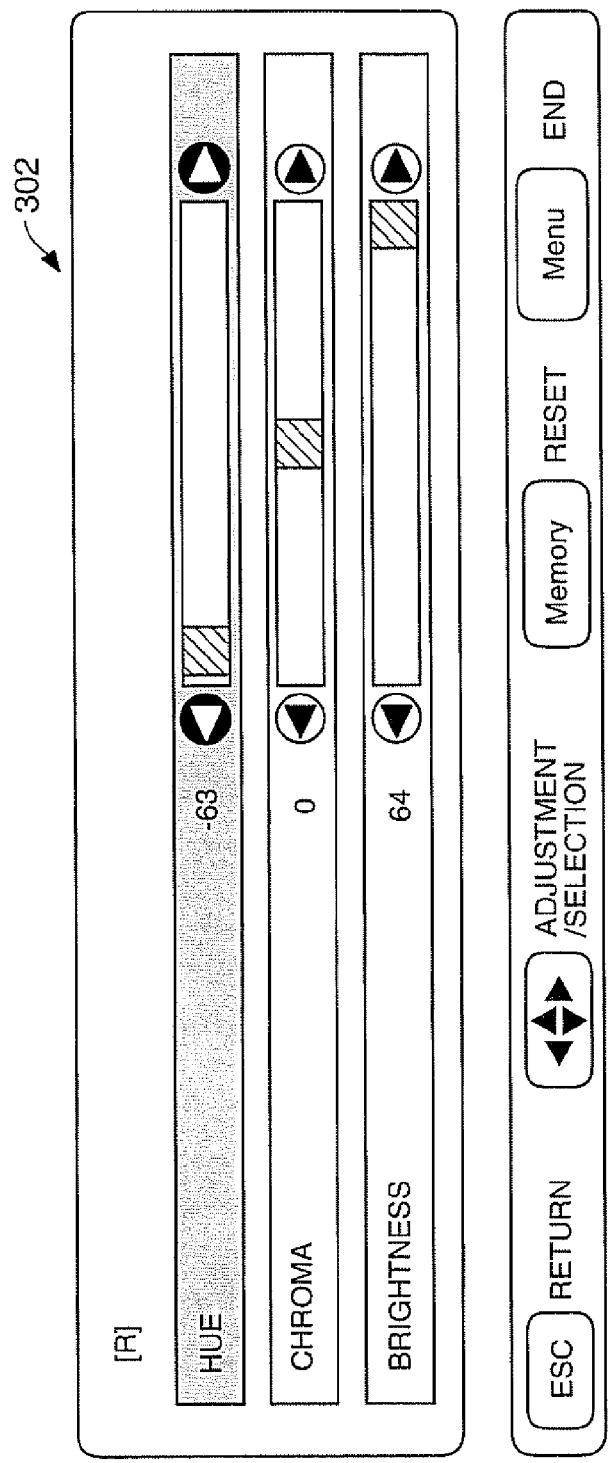
FIG. 4 is a view showing a second adjustment image according to the embodiment.

FIG. 3 is a view showing a first adjustment image 300 according to the embodiment. FIG. 4 is a view showing a second adjustment image 302 according to the embodiment. For example, the user performs operation of displaying the adjustment image 300 by using a remote controller to allow the adjustment image 300 to be projected by the projector 100.

The adjustment image 300 is an image showing adjustment states of respective hue, chroma and brightness of the reference color group including R, G, and B which are reference colors of an ROB system and C, M and Y which are reference colors of a CMY system. The user selects a reference color to be adjusted by pushing an arrow key in the up-and-down direction on the remote controller and moving a selection cursor in the adjustment image 300, then, determines the reference color by pushing a "Select" key on the remote controller. When the "Select" key is pushed, the adjustment image 302 for adjusting a color of the reference color is projected by the projector 100.

The adjustment image 302 is an image for adjusting hue, chroma and brightness of the selected reference color. The user selects any of hue, chroma and brightness by pushing an arrow key in the up-and-down direction on the remote controller and moving a selection cursor in the adjustment image 302, then, changes a set value by pushing an arrow key in the right-and-left direction on the remote controller. For example, in the example shown in FIG. 4, a set value of hue of R has been changed from −64 to −63. The adjustment image is separated to the adjustment image 300 and the adjustment image 302, therefore, the user can select and adjust only by the arrow key in the up-and-down direction and the right-and-left direction. The adjustment images 300, 302 may be an OSD (On Screen Display) and the like.

The adjustment information input unit 110 inputs operation information (adjustment information) from the remote controller (Step S2), the update unit 120 updates the color space information 132 and the like based on the adjustment information (Step S3). The set values of respective reference colors are stored in the storage unit 130 as part of the image data 134.

The adjustment information input unit 110 determines whether the adjustment has been completed or not by determining whether a "Menu" key on the remote controller has been pushed or not (Step S4). The projector 100 performs the processing of Step S2 to Step S4 repeatedly until the adjustment is completed. The user can push an "Esc" key on the remote controller in a state in which the adjustment image 302 is displayed to return to the adjustment image 300 and adjust another reference color.

Figure 5:
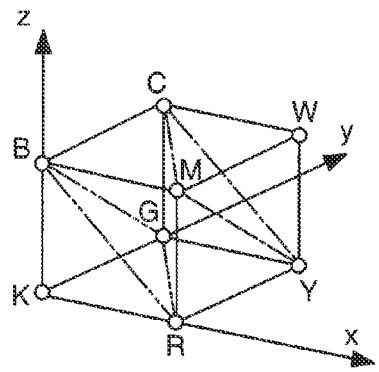
FIG. 5 is a view showing an example of a color space in the initial state.

Here, a method of updating the color space information 132 will be explained more specifically. First, the adjustment of hue will be explained. FIG. 5 is a view showing an example of a color space in the initial state. For example, the normal RGB color space is in the state shown in FIG. 5, which is a cubic shape having apexes R, G, B, C, M, Y, K and W (white), taking K (black) as an origin. The cube is arranged in a state in which a line passing through apexes KR is taken as the x-axis, a line passing through apexes KG is taken as the y-axis and a line passing through apexes KB is taken as the z-axis, and the cube touches respective axes.

Figure 6:
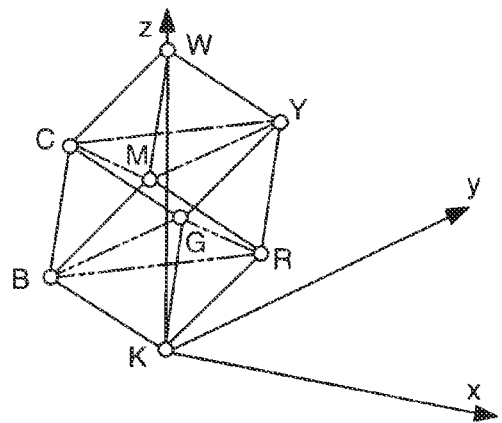
FIG. 6 is a view showing an example of the color space in a rotated state.

FIG. 6 is a view showing an example of a color space in a rotated state. In the embodiment, the correction unit 140 performs calculation in a state in which the cube shown in FIG. 5 is rotated so that the line passing through apexes KW corresponds to the z-axis. In the state shown in FIG. 6, a regular triangle of RGB is arranged at a position of ⅓ of a line segment KW and a regular triangle of CMY is arranged at a position of ⅔ of a line segment KW.

The calculation which rotates the line passing through apexes KW so as to correspond to the z-axis is represented by a rotation matrix A. Specifically, the rotation matrix A will be $$\text{Rotation matrix } A = \frac{1}{\sqrt{6}}\begin{pmatrix} 2 & -1 & -1 \\ 0 & \sqrt{3} & -\sqrt{3} \\ \sqrt{2} & \sqrt{2} & \sqrt{2} \end{pmatrix}.$$

In order to return coordinates shown in FIG. 6 to coordinates shown in FIG. 5, an inverse matrix B of the rotation matrix A may be used. The inverse matrix B will be $$\text{Inverse matrix } B = \frac{1}{\sqrt{6}}\begin{pmatrix} 2 & 0 & \sqrt{2} \\ -1 & \sqrt{3} & \sqrt{2} \\ -1 & -\sqrt{3} & \sqrt{2} \end{pmatrix}.$$

Figure 7:
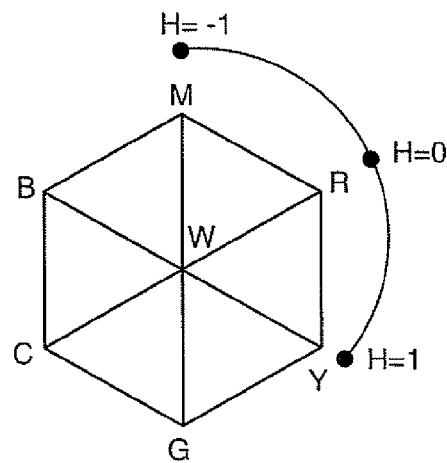
FIG. 7 is a schematic view of the color space at the time of adjusting hue.

FIG. 7 is a schematic view of a color space at the time of adjusting hue. For example, a shape shown in FIG. 7 is obtained when the cube shown in FIG. 6 is seen from the above direction (inverse direction of the z-direction). For example, when an adjustment value of hue is H, R will correspond to Y when H=1 and correspond to M when H=−1 under the condition that the H=0 is a default value. An angle RWY and an angle RWM are respectively 60 degrees.

For example, in the adjustment image 302, the hue is adjusted in values from −64 to 64, however, the adjustment value H of the hue is adjusted in values from −1 to 1. That is, the correction unit 140 calculates the adjustment value H of the hue by converting the set value of the hue set in the image data 134.

Figure 8:
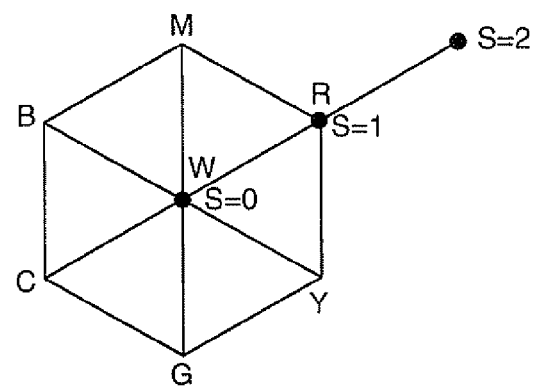
FIG. 8 is a schematic view of the color space at the time of adjusting chroma.

Next, the adjustment of chroma will be explained. FIG. 8 is a schematic view of a color space at the time of adjusting chroma. An adjustment value of chroma is S, in which S can be adjusted in a range from 0 to 2. S=1 is a default value and the chroma will be doubled when S=2. That is, the larger the S becomes, the further the distance from the z-axis (WK axis) becomes. In the adjustment image 302, the chroma is adjusted in values from −64 to 64, therefore, the correction unit 140 calculates the adjustment value S of the chroma by converting the set value of the chroma set in the image data 134.

Figure 9:
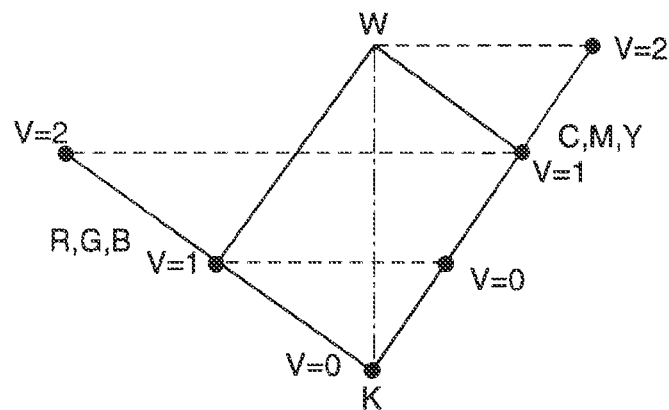
FIG. 9 is a schematic view of the color space at the time of adjusting brightness.

Next, the adjustment of brightness will be explained. FIG. 9 is a schematic view of a color space at the time of adjusting brightness. An adjustment value of brightness is V, in which V can be adjusted in a range from 0 to 2. As shown in FIG. 9, a V-value will be the magnification of distance from the apex K in the case of RGB. V=1 is a default value, RGB correspond to the apex K when V=0, and the brightness will be doubled when V=2.

In the case of CMY, when taking the value as the magnification as it is, the variation is too wide, therefore, the adjustment is performed so that the brightness will be half when V=3 and the brightness will be 1.5 times when V=2. Also, the brightness is adjusted in values from −64 to 64 in the adjustment image 302, therefore, the correction unit 140 calculates an adjustment value V of the brightness by converting the set value of the brightness set in the image data 134.

Figure 10:
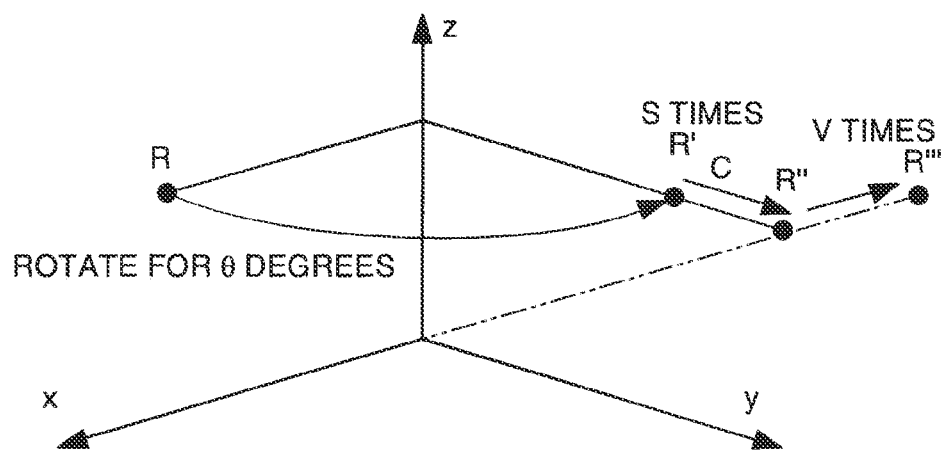
FIG. 10 is a schematic view of the color space when adjusting hue, chroma and brightness.

Next, a case in which hue, chroma and brightness are adjusted at the same time will be explained. FIG. 10 is a schematic view of the color space at the time of adjusting hue, brightness and chroma. Coordinates of R in the state shown in FIG. 6 will be (√6/3, 0, √3/3). A point obtained by rotating R about the z-axis for 0 degrees is R', a point obtained by multiplying the distance of R' from the z-axis by S is R" and a point obtained by multiplying R" by V based on the origin K is R'''. Coordinates of R''' will be $$R''' = \left(VS\frac{\sqrt{6}}{3}\cos\theta,\ VS\frac{\sqrt{6}}{3}\sin\theta,\ V\frac{\sqrt{3}}{3}\right).$$

When coordinates of R''' is returned to coordinates before rotation, it will be $$R''' = \frac{1}{\sqrt{6}}\begin{pmatrix} 2 & 0 & \sqrt{2} \\ -1 & \sqrt{3} & \sqrt{2} \\ -1 & -\sqrt{3} & \sqrt{2} \end{pmatrix}\begin{pmatrix} VS\frac{\sqrt{6}}{3}\cos\theta \\ VS\frac{\sqrt{6}}{3}\sin\theta \\ V\frac{\sqrt{3}}{3} \end{pmatrix} = \frac{V}{3}\begin{pmatrix} 1+2S\cos\theta \\ 1+S(\sqrt{3}\sin\theta-\cos\theta) \\ 1-S(\sqrt{3}\sin\theta+\cos\theta) \end{pmatrix}.$$

Therefore, the apex R in the color space is adjusted, RGB values of the apex R after adjustment will be $$R = \frac{V}{3}(1+2S\cos\theta)$$
$$G = \frac{V}{3}(1+S(\sqrt{3}\sin\theta-\cos\theta))$$
$$B = \frac{V}{3}(1+S(\sqrt{3}\sin\theta+\cos\theta)).$$

When the apex G is adjusted in the color space, RGB values of the apex G after adjustment is represented by the above equation, in which the R value of the apex R is replaced by the G value, G value is replaced by B value and the B value is replaced by R value, In addition, RGB values of the apex B after adjustment is represented by the above equation, in which the R value of the apex R is replaced by B value, the G value is replaced by the R value and the B value is replaced by G value. In the case that any of reference colors is adjusted, only the position of the reference color (for example, the apex R or the like) is changed, and positions of other reference colors (apexes) are not changed.

The arithmetic equation of CMY can be led in the same manner as RGB because coordinate values of the apex C in a state in which the cube is altered so that the WK axis becomes vertical in the rotation matrix A will be (−√6/3, 0, 2√3/3). However, the magnification of the brightness will be multiplied by (V+1)/2 because the magnification is not a value of V (0 to 2) itself but is adjusted so as to be multiplied by 0.5 to 1.5.

Therefore, when the apex C in the color space is adjusted, RGB values of the apex C after adjustment will be $$R = \frac{V+1}{6}(2-2S\cos\theta)$$
$$G = \frac{V+1}{6}(2-S(\sqrt{3}\sin\theta-\cos\theta))$$
$$B = \frac{V+1}{6}(2+S(\sqrt{3}\sin\theta+\cos\theta)).$$

When the apex M is adjusted in the color space, RGB values of the apex M after adjustment is represented by the above equation, in which the R value of the apex C is replaced by the G value, G value is replaced by B value and the B value is replaced by R value. In addition, ROB values of the apex Y after adjustment is represented by the above equation, in which the R value of the apex C is replaced by B value, the G value is replaced by the R value and the B value is replaced by G value.

As described above, the update unit 120 can update the color space information 132 based on the set value shown in the image data 134. The substance of the color space information 132 may be a table (for example, a lookup table and the like) or may be function values.

In a state in which the adjustment and the update of the color space information 132 have been completed, the image signal input unit 150 inputs an image signal (Step 55), and the correction unit 140 corrects the input image signal by referring to the color space information 132 (Step S6)

The correction unit 140 corrects the input image signal, for example, by performing linear interpolation calculation using a value of the color defined by the color space information 132 when correcting the color not defined by the color space information 132. The correction unit 140 also determines a value of the color after correction, for example, to a value of the color which is close in the color gamut when the value exceeds the color gamut as a result of the correction.

The projection unit 190 forms an image and projects it on the liquid crystal panel based on the image signal corrected by the correction unit 140 (Step S7).

As described above, according to the embodiment, the projector 100 updates the color space information 132 by allowing rotational movement of the selected reference color, taking a line connecting a white color to a black color as a rotation axis when adjusting hue, thereby adjusting the color to a target color without changing brightness even when the hue is adjusted.

According to the embodiment, the projector 100 performs calculation based on the inverse matrix B of the rotation matrix A when allowing the rotational movement of the reference color for adjusting the hue, thereby calculating a value more efficiently.

According to the embodiment, the projector 100 updates the color space information 132 by moving the reference color on a line connecting the reference color to the black color or the white color when adjusting brightness, thereby adjusting the color to a target color without changing chroma even when the brightness is adjusted.

According to the embodiment, the projector 100 adjusts chroma by changing the distance from the WK axis when adjusting the chroma, thereby adjusting the color to a target color without changing brightness or hue.

According to the embodiment, the projector 100 corrects the RGB signal by using the RGB color space, thereby adjusting the color of the image more efficiently as it is not necessary to perform conversion and the like of the color space.

Further, according to the embodiment, the projector 100 can input adjustment information according to the input by the user by using the adjustment images 300, 302, therefore, the color in accordance with the user's object can be generated.

The application of the invention is not limited to the above embodiment and can be variously modified. For example, the configurations of the adjustment images 300, 302 are not limited to the configurations shown in FIG. 3 and FIG. 4. For example, it is also preferable to have a configuration in which the states of all reference colors can be displayed and adjusted by one image. In addition, set values in the adjustment images 300, 302 are allowed to correspond to internal adjustment values. The projector 100 can display a sample image and the like when the adjustment is performed. Every time the adjustment is performed, the color of the sample image may be displayed, corrected according to the adjustment.

The plural reference colors in the RGB system are not limited to three colors of R, G and B, and it is preferable that they are two colors or more than four colors. In addition, the plural reference colors in the CMY system are not limited to three colors of C, M and Y, and it is preferable that they are two colors or more than four colors. The reference color may be a neutral color between the reference colors of the above RGB and the like.

Additionally, the color space is not limited to the RGB color space and an optional color space can be applied according to the type of an input image signal.

The projector 100 is not limited to a liquid crystal projector, and it may be, for example, a projector and the like using a DMD (Digital Micromirror Device). Note that the DND is a trademark of Texas Instruments Incorporated in U.S.A. It is also preferable that functions of the projector 100 are divided into plural apparatuses (for example, a PC and a projector) to be mounted thereon.

The display device to which the invention can be applied is not limited to the projector 100, and for example, it can be a television, a liquid crystal monitor, a PDA, a cellular phone and the like. The electronic device on which the image processing system of the invention can be mounted is not limited to the display device, and the image processing system of the invention can be mounted on various electronic devices performing input, correction and output of image signals.

The entire disclosure of Japanese Patent Application No. 2007-207652 filed Aug. 9, 2007 is expressly incorporated by reference herein.

What is claimed is:

1. A projector comprising:
a correction unit correcting an input image signal based on a three-dimensional color space having apexes of respective reference colors, a black color and a white color, the respective reference colors including plural reference colors of an RGB and CMY system in the three-dimensional color space;
a projection unit projecting an image based on the input image signal corrected by the correction unit; and
an update unit updating the three-dimensional color space by:
converting a first apex of the apexes of the respective reference colors into an HSV color space in accordance with a predetermined rotation matrix,
adjusting at least one of a hue, chroma, and brightness of the first apex in the HSV color space according to adjustment information of the first apex to obtain an adjusted first apex,
converting the adjusted first apex to the three-dimensional color space in accordance with an inverse matrix of the predetermined rotation matix, and
replacing the first apex with the adjusted first apex;
wherein:
when the first apex corresponds to a CMY reference color and the adjustment information indicates the brightness of the first apex is to be adjusted, the update unit adjusts the brightness of the first apex by smaller increments as compared to when the first apex corresponds to a RGB reference color, and
the correction unit corrects the input image signal based on an updated color space from the update unit, the input image signal being input after the update unit updates the color space.

2. The projector according to claim 1,
wherein when the adjustment information indicates that the brightness of the first apex is to be adjusted, the update unit updates the color space by moving the first apex on a line connecting the reference color to the black color or the white color in the HSV color space based on the adjustment information.

3. The projector according to claim 1,
wherein when the adjustment information indicates that the chroma of the first apex is to be adjusted, the update unit updates the color space by moving the first apex on a line orthogonal to a line connecting the black color and the white color as well as passing through the reference color in the HSV color space based on the adjustment information.

4. The projector according to claim 1,
wherein the color space is an RGB color space; and
wherein the correction unit adjusts the color of an image displayed on a display device by correcting the input image signal.

5. The projector according to claim 1, further comprising:
an adjustment information input unit inputting the adjustment information, wherein
the projection unit projects an adjustment image for adjusting hue, chroma and brightness of each reference color, and
the adjustment information input unit inputs the adjustment information according to the adjustment in the adjustment image.

6. A projector comprising:
a correction unit correcting an input image signal based on a three dimensional color space having apexes of respective reference colors, a black color and a white color, the respective reference colors including plural reference colors of an RGB and CMY system in the three-dimensional color space;
a projection unit projecting an image based on the input image signal corrected by the correction unit; and
an update unit updating the three-dimensional color space by:
converting a first apex of the apexes of the respective reference colors into an HSV color space,
adjusting at least one of a hue, chroma, and brightness of the first apex in the HSV color space according to adjustment information of the first apex to obtain an adjusted first apex,
converting the adjusted first apex to the three-dimensional color space, and
replacing the first apex with the adjusted first apex;
wherein:
when the first apex corresponds to a CMY reference color and the adjustment information indicates the brightness of the first apex is to be adjusted, the update unit adjusts the brightness of the first apex by smaller increments as compared to when the first apex corresponds to a RGB reference color, and
the correction unit corrects the input image signal based on an updated color space from the update unit, the input image signal being input after the update unit updates the color space.

7. The projector according to claim 6,
wherein when the adjustment information indicates that the chroma of the first apex is to be adjusted, the update unit updates the color space by moving the first apex on a line orthogonal to a line connecting the black color and the white color as well as passing through the reference color in the HSV color space based on the adjustment information.

8. The projector according to claim 6,
wherein the color space is an RGB color space, and
wherein the correction unit adjusts the color of an image displayed on a display device by correcting the input image signal.

9. The projector according to claim 6, further comprising:
an adjustment information input unit inputting the adjustment information, wherein
the display unit displays an adjustment image for adjusting hue, chroma and brightness of each reference color, and
the adjustment information input unit inputs the adjustment information according to the adjustment in the adjustment image.

10. The projector according to claim 1,
wherein when the adjustment information indicates that the hue of the first apex is to be adjusted, the update unit updates the color space by circularly rotating the first apex about a line connecting the white color to the black color in the HSV color space based on the adjustment information.

\* \* \* \* \*